(12) United States Patent
Huh et al.

(10) Patent No.: US 10,371,957 B2
(45) Date of Patent: Aug. 6, 2019

(54) DISPLAY DEVICE INCLUDING A LENS PANEL HAVING A PLURALITY OF OPENINGS RESPECTIVELY OVERLAPPING A PLURALITY OF CONCAVE PORTIONS OF AN ELECTRODE

(71) Applicant: Samsung Display Co., Ltd., Yongin-si, Gyeonggi-do (KR)

(72) Inventors: Su Jung Huh, Yongin-si (KR); Beom Shik Kim, Yongin-si (KR); In SUn Hwang, Suwon-si (KR)

(73) Assignee: Samsung Display Co., Ltd. (KR)

( * ) Notice: Subject to any disclaimer, the term of this patent is extended or adjusted under 35 U.S.C. 154(b) by 21 days.

(21) Appl. No.: 15/586,587

(22) Filed: May 4, 2017

(65) Prior Publication Data

US 2018/0081187 A1 Mar. 22, 2018

(30) Foreign Application Priority Data

Sep. 22, 2016 (KR) .................. 10-2016-0121609

(51) Int. Cl.
*G02B 3/00* (2006.01)
*G02B 3/14* (2006.01)
*G02F 1/29* (2006.01)
*G02B 27/22* (2018.01)

(52) U.S. Cl.
CPC ....... *G02B 27/2214* (2013.01); *G02B 3/0006* (2013.01); *G02B 3/0056* (2013.01); *G02B 3/14* (2013.01); *G02F 1/29* (2013.01)

(58) Field of Classification Search
CPC .................................. G02B 27/2214
See application file for complete search history.

(56) References Cited

U.S. PATENT DOCUMENTS

| 8,614,771 B2 | 12/2013 | Hong et al. | |
|---|---|---|---|
| 2007/0127102 A1* | 6/2007 | Obinata | G02B 3/0056 359/665 |
| 2010/0039583 A1* | 2/2010 | Usukura | G02B 3/0006 349/62 |

(Continued)

FOREIGN PATENT DOCUMENTS

| KR | 10-0440955 | 7/2004 |
|---|---|---|
| KR | 10-2012-0095035 | 8/2012 |

(Continued)

*Primary Examiner* — Paul C Lee
(74) *Attorney, Agent, or Firm* — Innovation Counsel LLP

(57) ABSTRACT

A display device according to an exemplary embodiment includes a display panel including a plurality of pixels, and a lens panel positioned at a side of the display panel in a direction in which the display panel is configured to display an image. The lens panel includes a first electrode having a plurality of recess portions, a second electrode having a plurality of openings respectively overlapping the plurality of recess portions one by one, and a lens formation layer positioned between the first electrode and the second electrode. A recess portion among the plurality of recess portions overlaps two or more pixels among the plurality of pixels, and an opening among the openings overlaps the two or more pixels among the plurality of pixels. A circumference of the opening is positioned inside a circumference of the recess portion.

12 Claims, 8 Drawing Sheets

(56) References Cited

U.S. PATENT DOCUMENTS

| | | | |
|---|---|---|---|
| 2011/0205342 A1* | 8/2011 | Lin | G02B 27/2214 |
| | | | 348/54 |
| 2012/0320288 A1* | 12/2012 | Baek | G02B 3/14 |
| | | | 349/5 |
| 2013/0107174 A1* | 5/2013 | Yun | G02F 1/133526 |
| | | | 349/96 |
| 2014/0285703 A1* | 9/2014 | Kizu | G02F 1/13306 |
| | | | 348/340 |
| 2015/0077669 A1 | 3/2015 | Wu | |
| 2015/0221894 A1* | 8/2015 | Setz | G02B 3/005 |
| | | | 359/320 |
| 2015/0293273 A1* | 10/2015 | Chen | G02B 5/0278 |
| | | | 362/355 |
| 2016/0068755 A1 | 3/2016 | Beltran | |

FOREIGN PATENT DOCUMENTS

| | | |
|---|---|---|
| KR | 10-2014-0141947 | 12/2014 |
| KR | 10-2016-0002054 | 1/2016 |

* cited by examiner

DISPLAY DEVICE INCLUDING A LENS PANEL HAVING A PLURALITY OF OPENINGS RESPECTIVELY OVERLAPPING A PLURALITY OF CONCAVE PORTIONS OF AN ELECTRODE

CROSS-REFERENCE TO RELATED APPLICATION

This application claims priority to and the benefit of Korean Patent Application No. 10-2016-0121609 filed in the Korean Intellectual Property Office on Sep. 22, 2016, the entire contents of which are incorporated herein by reference.

BACKGROUND

(a) Technical Field

The present disclosure relates to a display device including a lens panel, and in detail, relates to a display device including a lens panel capable of switching between a two-dimensional mode and a three-dimensional mode.

(b) Description of the Related Art

A three-dimensional (3D) image display device has attracted attention according to developments of display device techniques, and various 3D image display devices have been researched.

A 3D image display technology represents a stereoscopic effect of objects using binocular parallax, which is the most important factor for recognizing a stereoscopic effect. The 3D image display device may be classified into those using various methods, and may be largely classified into a stereoscopic 3D image display device and an autostereoscopic 3D image display device. In a case of the stereoscopic 3D image display device, there is a drawback that spectacles must be worn such that further development of the autostereoscopic 3D image display device is required.

The autostereoscopic 3D image display device may be classified into those using a multi-viewpoint method or a super multi-viewpoint method in which the 3D image may be observed without spectacles in a specific viewing angle region, and an integrated image method, a volume image method, and a hologram method that provide the 3D image to be closer to actual 3D reality.

The 3D image display device requires a lens array unit to divide the image into a plurality of viewing point regions to be displayed, and a lens panel capable of switching between a two-dimensional mode and a three-dimensional mode may be used by using liquid crystal molecules as the lens array unit.

The above information disclosed in this Background section is only for enhancement of understanding of the background and therefore it may contain information that does not form the prior art that is already known in this country to a person of ordinary skill in the art.

SUMMARY

The exemplary embodiment of the present disclosure improves a characteristic of a 3D image by preventing distortion of a lens shape formed by a lens panel.

A display device according to an exemplary embodiment includes a display panel including a plurality of pixels, and a lens panel positioned at a side of the display panel in a direction in which the display panel is configured to display an image. The lens panel includes a first electrode having a plurality of recess portions, a second electrode having a plurality of openings respectively overlapping the plurality of recess portions one by one, and a lens formation layer positioned between the first electrode and the second electrode. A recess portion among the plurality of recess portions overlaps two or more pixels among the plurality of pixels, and an opening among the openings overlaps the two or more pixels among the plurality of pixels. A circumference of the opening is positioned inside a circumference of the recess portion.

A substrate facing the second electrode with the first electrode interposed therebetween may be further included, and each of the plurality of recess portions may have a concave shape wherein a center of each of the plurality of recess portions closest to and faces the substrate.

A shape of the circumference of the recess portion may be one among circular, oval, and polygonal.

A shape of the circumference of the opening may be one among the circular, the oval, and the polygonal.

The center of each of the plurality of recess portions may match a center of each of the plurality of openings that respectively corresponds to the recess portions one by one.

The plurality of pixels may be arranged in a first direction and a second direction that are perpendicular to each other, and a straight line connecting two or more among the centers of the plurality of recess portions may be oblique with respect to the first direction and the second direction.

The circumference of the recess portion may be hexagonal, and the circumference of the opening may be hexagonal.

The circumference of the recess portion may be quadrangular, and the circumference of the opening may be circular.

A difference between a width of the opening and a width of the recess portion may be in a range from about 0.1 micrometers to about 5 micrometers.

The lens formation layer may be configured to realize a first mode or a second mode depending on application of voltages to the first electrode and the second electrode.

The lens formation layer may include a plurality of liquid crystal molecules.

If a voltage difference is applied between the first electrode and the second electrode, the plurality of liquid crystal molecules may be arranged in a shape of lenses that respectively correspond to the plurality of recess portions one by one.

A concave part of each of the plurality of recess portions may be filled with at least one of a resin and an alignment material.

A first resin layer positioned between the substrate and the first electrode and having a surface with a shape that is concave with a same shape as the plurality of recess portions at positions corresponding to the plurality of recess portions may be further included.

The display panel and the lens panel may be adhered to each other by an optical adhesion material.

According to an exemplary embodiment of the present disclosure, the distortion of the lens shape depending on the position of the electrode of the lens panel is prevented such that the characteristic of the 3D image realized by the display device including the lens panel may be improved.

DETAILED DESCRIPTION OF THE EMBODIMENTS

Figure 1:
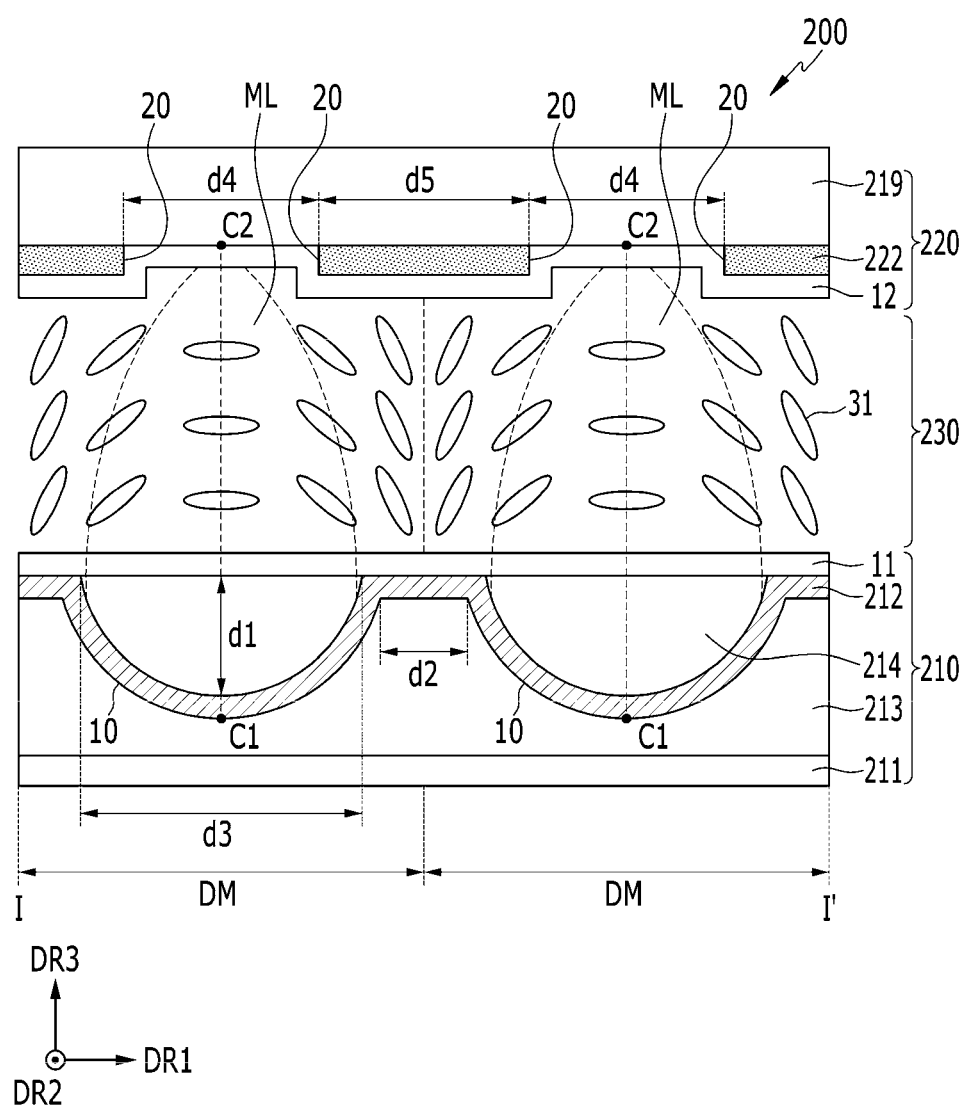
FIG. 1 is a cross-sectional view of a lens panel according to an exemplary embodiment.

The inventive concept will be described more fully hereinafter with reference to the accompanying drawings, in which exemplary embodiments are shown. As those skilled in the art would realize, the described embodiments may be modified in various different ways, all without departing from the spirit or scope of the inventive concept.

In order to clearly explain the inventive concept, portions that are not directly related to the inventive concept are omitted, and the same reference numerals are attached to the same or similar constituent elements through the entire specification.

In addition, the size and thickness of each configuration shown in the drawings are arbitrarily shown for better understanding and ease of description, but the embodiments are not limited thereto. In the drawings, the thickness of layers, films, panels, regions, etc., are exaggerated for clarity. In the drawings, for better understanding and ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or above the object portion, and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Further, in the specification and drawings, a surface formed in a first direction DR1 and a second direction DR2 that perpendicularly cross each other or a view when observing a structure on a surface parallel thereto is referred to as "in a plan view'. A surface formed in a third direction DR3 perpendicular to the surface formed the first direction DR1 and the second direction DR2 and one direction of the first direction DR1 and the second direction DR2 or a view when observing a structure on a surface parallel thereto is referred to as "in a sectional view".

A lens panel according to an exemplary embodiment will now be described with reference to FIG. 1 and FIG. 2.

Figure 2:
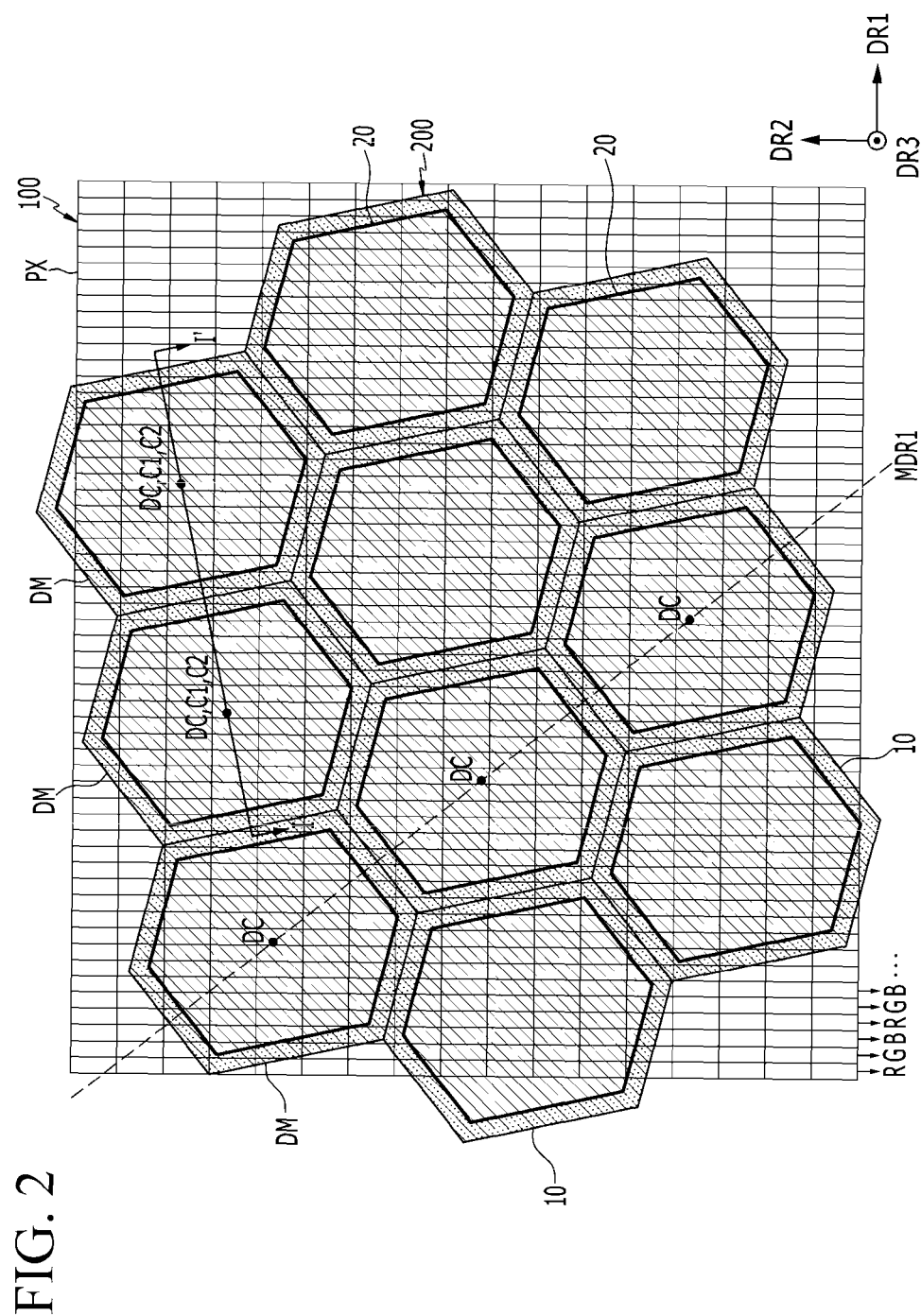
FIG. 2 is a top plan view of a lens panel according to an exemplary embodiment.

FIG. 1 is a cross-sectional view of a lens panel 200 according to an exemplary embodiment, and FIG. 2 is a top plan view of the lens panel 200 according to an exemplary embodiment. Particularly, FIG. 1 is a cross-sectional view of the lens panel 200 of FIG. 2 taken along a line I-I'.

The lens panel 200 according to an exemplary embodiment, in a sectional view, includes a first electrode unit 210 and a second electrode unit 220 facing each other, and a lens formation layer 230 positioned between the first electrode unit 210 and the second electrode unit 220. When viewing the lens panel 200 in a plane, a partial or entire region of the lens panel 200 is divided into a plurality of domains DM. Each domain DM is a region where one lens ML is formed in the lens formation layer 230. This will be described in detail.

The first electrode unit 210 may be a plate or a film having a main surface mainly extending on a surface parallel to a surface formed in the first direction DR1 and the second direction DR2, however it is not limited thereto, and it may be the plate and the film forming a curved surface. The first electrode unit 210 includes a first substrate 211, at least one first electrode 212, and a first alignment layer 11.

The first electrode 212 includes a plurality of recess portions 10 as electrodes of a concave shape. The recess portion 10 is a portion having a shape of which the first electrode 212 mainly extending on the surface parallel to the surface formed in the first direction DR1 and the second direction DR2 is partially concave in a third direction DR3. The recess portion 10 may have a concave shape in which each center C1 of the recess portions 10 is closest to and faces the first substrate 211. The center C1 of the recess portion 10 may be positioned at the surface of the recess portion 10 and a middle point of the recess portion 10, however when the recess portion 10 is not perfectly symmetrical, it may be the middle-most point of the recess portion 10 positioned at the surface of the recess portion 10. The recess portion 10 has an approximate semi-circular shape in a sectional view, and a circumference of the recess portion 10 may have an approximately hexagonal shape in a plan view. One recess portion 10 is positioned in one domain DM, and a planar area of the one recess portion 10 may be equal to or smaller than the area of the one domain DM. That is, the circumference of the hexagonal shape of the recess portion 10 may be matched with a boundary of the domain DM or may be positioned inside the boundary of the domain DM.

In a plan view, the center C1 of the recess portion 10 may be matched with an approximate center DC of the domain DM in which the recess portion 10 is positioned. Here, the center DC of the domains DM may be a center of gravity for a flat figure of the domain DM, however it is not limited thereto, and it may be a crossing point of two or more lines or various centers that are symmetry references of the domain DM shape A sectional depth d1 of the recess portion 10 may be in a range from about 5 micrometers to about 10 micrometers, and a curvature of the recess portion 10 may be about 100 micrometers. Also, an interval d2 between the recess portions 10 in a plan view may be in a range from about 3 micrometers to about 5 micrometers, and a width d3 of the recess portion 10 may be about 60 micrometers or less in a plan view. However, these values are only exemplary, and the embodiments are not limited thereto. It is suitable that the interval d2 between the recess portions 10 is formed to be small.

A first resin layer 213 may be positioned between the first electrode 212 and the first substrate 211. A surface on which first resin layer 213 is in contact with the first electrode 212 may have the same shape as the first electrode 212 having the recess portion 10. That is, the first resin layer 213 has the surface that is concave in the same shape as the recess portion 10 at the position corresponding to the recess portion 10. The first resin layer 213 may include a polymer, and particularly may include a resin.

A second resin layer 214 may be positioned in the recess portion 10 of the first electrode 212. The second resin layer 214 fills the recess portion 10 such that the surface on the first electrode 212 and the second resin layer 214 may be made to be flat. In FIG. 1, it is shown that the second resin layer 214 is only positioned in the recess portion 10, however the second resin layer 214 may cover the entire surface of the first electrode 212 depending on the exemplary embodiment. The second resin layer 214 may include the polymer and may be formed of the same material as the first resin layer 213.

The first alignment layer 11 is positioned on the first electrode 212 and the second resin layer 214, that is, between the first electrode 212 and the second resin layer 214, and the lens formation layer 230. The first alignment layer 11 may define an alignment direction of liquid crystal molecules 31. The first alignment layer 11 according to an exemplary embodiment may be a horizontal alignment layer, however it is not limited thereto, and it may be a vertical alignment layer. According to an exemplary embodiment, the second resin layer 214 may be omitted and the first alignment layer 11 may fill the inside of the recess portion 10.

The second electrode unit 220 may be the plate or the film having a main surface mainly extending on the surface parallel to the surface formed in the first direction DR1 and the second direction DR2, however it is not limited thereto, and it may be the plate and the film forming a curved surface. The second electrode unit 220 includes a second substrate 219, at least one second electrode 222, and a second alignment layer 12.

The second electrode 222 may face the first electrode 212 with the lens formation layer 230 interposed therebetween.

The second electrode 222 has a plurality of openings 20. The opening means a region where the second electrode 222 is removed in a plan view. The opening 20 is formed at the position respectively corresponding to the recess portion 10 of the first electrode 212 one by one. In a plan view, the center C2 of the opening 20 may be approximately matched with the center C1 of the recess portion 10. Here, the center C2 of the opening 20 may be the middle of the opening 20, that is, the crossing point of two or more lines that are the symmetry references of the opening 20, and when the opening 20 is not perfectly symmetrical, it may be the middle-most position of the opening 20.

The opening 20 may have a shape such as circular, oval, and polygonal in a plan view. FIG. 2 shows an example that the planar shape of the opening 20 is hexagonal, and in this case, the circumference of the recess portion 10 may also be hexagonal. In a plan view, the width d4 of the opening 20 is smaller than the width d3 of the recess portion 10. That is, the circumference of the opening 20 is positioned within the circumference of the recess portion 10. In other words, the second electrode 222 is positioned to the inside of the circumference of the recess portion 10. A difference between the width d4 of the opening 20 and the width d3 of the recess portion 10 may be in a range from about 0.1 micrometers to about 5 micrometers. The interval d5 between the openings 20 may be about 2.5 micrometers. However, these values are only exemplary, and the embodiments are not limited thereto.

The second alignment layer 12 is positioned between the second electrode 222 and the lens formation layer 230. The second alignment layer 12 may define the alignment of the liquid crystal molecules 31. The second alignment layer 12 according to an exemplary embodiment may be the horizontal alignment layer, however it is not limited thereto, and it may be the vertical alignment layer.

In FIG. 2, the planar circumference of the domains DM, the recess portion 10, and the opening 20 of the second electrode 222 are hexagonal, however it is not limited thereto, and their shapes may be circular, oval, polygonal, and the like depending on the exemplary embodiment. When the shape of the planar circumference of the domain DM, the recess portion 10, and the opening 20 of the second electrode 222 is one of the various polygons, particularly, it may be a convex polygon in which all inner angles are smaller than 180 degrees. For example, the shape of one domain DM may be hexagonal as shown, however it is not limited thereto, and it may be quadrangular, pentagonal, and the like. When one domain DM is a polygon having n sides, n is a natural number of 3 or more, one domain DM may be adjacent to n surrounding domains DM, and two adjacent domains DM may share one side and may be adjacent.

Lengths of the sides of one domain DM are the same to be a regular polygon, however it is not limited thereto, and the domain may have sides of different lengths from each other. That is, the length in one direction in a plane of one domain DM may be longer than the length in a different direction.

The size and the shape of the plurality of domains DM included in the lens panel 200 may be uniform, however it is not limited thereto, and domains DM of different shapes may be included. Also, the shape of the domains DM is not limited to the polygon, and the domains DM may have irregular shape. In this case, the shape of the plurality of domains DM included in the lens panel 200 may not be uniform depending on the position.

The shape of the plane circumference of the recess portion 10 is also not limited to the polygon, and it may have the irregular shape and may be the same as the shape of the domain DM. Also, the lengths of sides of the recess portion 10 may be the same to be the regular polygon, but the shape may have sides of different lengths. Further, the recess portion 10 having different shapes depending on the position of the first electrode 212 may be included.

The opening 20 is also not limited to the polygonal shape, and it may have the irregular shape and may not have the same shape as that of the circumference of the recess portion 10. In addition, the opening 20 may form the regular polygon but may have sides having different lengths from each other. Also, the openings 20 of the different shapes depending on the position of the second electrode 222 may be included.

As the resolution of the lens panel 200 becomes higher, the size of the recess portion 10 and the opening 20 may decrease.

At least one of the first substrate 211 and the second substrate 212 may be adhered to a device applied with the lens panel 200 or may be omitted depending on the formation method.

The lens formation layer 230 as a switchable light modulation layer may control the phase of the transmitted light to control the path of the light. For example, the lens formation layer 230 may be a liquid crystal layer including the plurality of anisotropic liquid crystal molecules 31. The liquid crystal molecules 31 may have positive dielectric anisotropy, but are not limited thereto. The width in the third direction DR3 of the lens formation layer 230, that is, the gap between the first electrode unit 210 and the second electrode unit 220, may be in a range from about 6 micrometers about 8 micrometers, but it is not limited thereto.

The refractive index of the long axis of the liquid crystal molecules 31 and the refractive index of the polymer included in the first resin layer 213 or the second resin layer 214 may be matched.

The lens formation layer 230 has a refractive index distribution that is differentiated depending on a voltage difference applied between the first electrode 212 and the second electrode 222, thereby controlling the path of light. The lens formation layer 230 may be operated with a plurality of modes including a first mode and a second mode depending on application of voltages to the first electrode 212 and the second electrode 222 or not, that is depending on the voltage difference applied between the first electrode 212 and the second electrode 222.

In the first mode, a minimum voltage difference, e.g., 0 V, may be applied between the first electrode 212 and the second electrode 222. In the first mode, the arrangement direction of the liquid crystal molecules 31 of each domain DM, that is, the direction of the long axes of the liquid crystal molecules 31, may be constant. For example, in the first mode, the liquid crystal molecules 31 are arranged such that the long axis thereof may be arranged to be approximately parallel to the main surface of the first electrode unit 210 or the second electrode unit 220. However, in the first mode, the long axes of the liquid crystal molecules 31 may be arranged to be approximately perpendicular to the main surface of the first electrode unit 210 or the second electrode unit 220.

In the second mode, if a voltage difference that is appropriately determined by an experimental or a calculation is applied between the first electrode 212 and the second electrode 222, an electric field is generated in the lens formation layer 230 such that the liquid crystal molecules 31 are rearranged. Particularly, as in FIG. 1, in each domain DM, the liquid crystal molecules 31 are differently inclined depending on the position by a fringe field between the first electrode 212 including the recess portion 10 and the second electrode 222 about the edge of the opening 20. When the liquid crystal molecules 31 have positive dielectric anisotropy, the liquid crystal molecules 31 may be arranged in a direction approximately parallel to the electric field direction.

In detail, the liquid crystal molecules 31 in each domain DM are inclined with different angles depending on the positions in the domain DM, thereby the lens formation layer 230 forms a different refractive index distribution depending on the position in one domain DM. Accordingly, the light passing through the lens formation layer 230 may experience different phase retardation depending on the position in the domain DM. In detail, the liquid crystal molecules 31 positioned near the center DC of the domain DM are arranged to be approximately parallel to the main surface of the first electrode unit 210 or the second electrode unit 220, and the liquid crystal molecules 31 positioned near the edge of the domain DM may be approximately inclined toward the center DC of the domains DM. The inclination angle of the liquid crystal molecules 31 for the main surface of the first electrode unit 210 or the second electrode unit 220 may increase closer to the edge of the domain DM. Accordingly, the shape in which the liquid crystal molecules 31 are arranged in each domain DM is similar to that of a plane convex lens, and the lens formation layer 230 in each domain DM forms the lens ML that may change the light path.

In a plan view, the lenses ML may be formed to respectively correspond to the recess portions 10 one by one, and the region outside the recess portion 10 may not be included in the effective lens ML. The liquid crystal molecules 31 that are not influenced by the fringe field due to the edge of the opening 20 and the electric field by the recess portion 10 may not contribute to the effective lens ML.

A fill factor represents a plane area ratio of only the effective lens ML excluding a part where the liquid crystal molecules 31 are equally arranged without a refractive index difference such that the lens function does not appear for the domain DM, and since the fill factor problem is mainly generated in the region corresponding to an interval d2 between the recess portions 10, the fill factor may be formed to be closer to 100% as the interval d2 between the recess portions 10 is formed to be narrower.

Referring to FIG. 2, the above-described lens panel 200 may be used with a display panel 100, and in this case, one domain DM may overlap two or more pixels PX of the display panel 100 in a plan view. When the pixels PX of the display panel 100 are arranged in a row and a column respectively parallel to the first direction DR1 and the second direction DR2, the domains DM of the lens panel 200 may be arranged in a direction that is obliquely inclined with respect to the first direction DR1 and the second direction DR2. In this case, a first domain direction MDR1 connecting centers DC of domains DM may be slanted with respect the second direction DR2. When the domains DM of the lens panel 200 are arranged in a row in a direction obliquely inclined with respect to the row or column which is an arrangement direction of the pixels PX, the row of the domains DM may be oblique to an extending direction of a light blocking member positioned between the plurality of pixels PX. Accordingly, the part where the recess portion 10 is not positioned among the first electrode 212, that is, the region between the recess portions 10, is arranged to be oblique to the light blocking member, thereby preventing a moiré phenomenon in which a pattern is generated in the periphery thereof.

Alternately, according to an exemplary embodiment, the first domain direction MDR1 may be substantially parallel to the second direction DR2.

The display panel 100 and the lens panel 200 may be adhered to each other by an optical adhesive such as an optically clear resin (OCR) or an optically clear adhesive (OCA). As an optical adhesive material, a material having low influence on the refractive index and high transmittance can be used. The optical adhesive material may include an acryl-based polymer, a silicone-based polymer, a urethane-based polymer, and the like.

Next, the effect of the lens panel according to an exemplary embodiment will be described with reference to FIG. 3 and FIG. 4.

Figure 3:
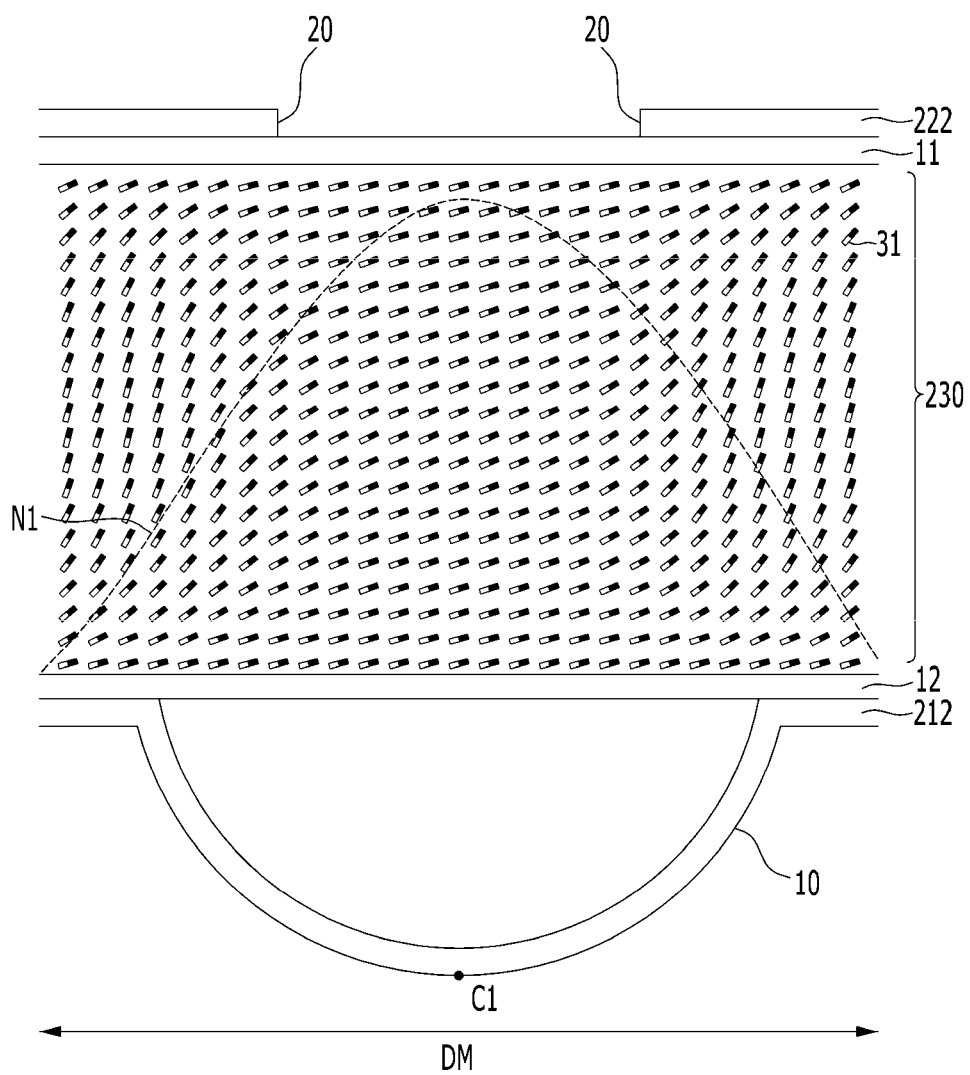
FIG. 3 is a simulation result showing a liquid crystal arrangement when a lens formation layer of a lens panel according to an exemplary embodiment forms a lens.

FIG. 3 is a simulation result showing liquid crystal arrangement when a lens formation layer of a lens panel according to an exemplary embodiment forms a lens. FIG. 4 is a graph of a refractive index of a lens formation layer when a lens panel according to a comparative example forms a lens.

FIG. 3 as a simulation result showing an arrangement of the liquid crystal molecules 31 in detail when the lens panel 200 of FIG. 1 is in the second mode, and particularly shows the arrangement of the liquid crystal molecules 31 of the lens formation layer 230 in one domain DM. In the simulation, the liquid crystal molecules 31 are initially set to pretilt toward right, so that the orientations of the liquid crystal molecules 31 are tilted toward right. A first line N1 represents the magnitude of the refractive index or phase retardation by the arranged liquid crystal molecules 31 depending on the position as a graph. The shape of the first line N1 corresponds to a lens shape. Differently from FIG. 3, if the liquid crystal molecules 31 were not pretilted, the orientations of the liquid crystal molecules 31 would be symmetric with respect to a vertical line passing the center C1 similarly to FIG. 1. Even for this case, a shape of the magnitude of the refractive index or phase retardation by the arranged liquid crystal molecules 31 would be similar to the first line N1 as shown in FIG. 3. Referring to the first line N1, without the phenomenon of the refractive index or phase retardation by the liquid crystal molecule 31 being sharply changed and without distorting the lens shape, it may be confirmed that the refractive index by the liquid crystal molecule 31 is gradually and smoothly changed as going closer toward the circumference part of the recess portion 10 from the center C1 of the first electrode 212.

If the opening 20 is omitted, the recess portion 10 of the second electrode 222 has a large voltage deviation between the center C1 and the circumference of the recess portion 10 based on the voltage of the second electrode 222 due to the concave shape. When the voltage deviation of the recess portion 10 is not large, the liquid crystal molecules 31 are rearranged thereby forming the lens shape, however when the voltage deviation between the center C1 and the circumference of the recess portion 10 is large, the refractive index of the liquid crystal molecules 31 positioned between the center C1 and the circumference of the recess portion 10 is sharply changed such that the lens shape may be distorted.

However, by disposing the opening 20 having the smaller width than the recess portion 10 to position the boundary of the opening 20 between the center C1 and the circumference of the recess portion 10, the voltage deviation formed by the recess portion 10 of the first electrode 212 is offset by the voltage deviation formed by the opening 20 of the second electrode 222 to make the voltage difference deviation between the center C1 of the recess portion 10 and the circumference of the recess portion 10 to be smooth, thereby forming the ideal shape of the lens.

Figure 4:
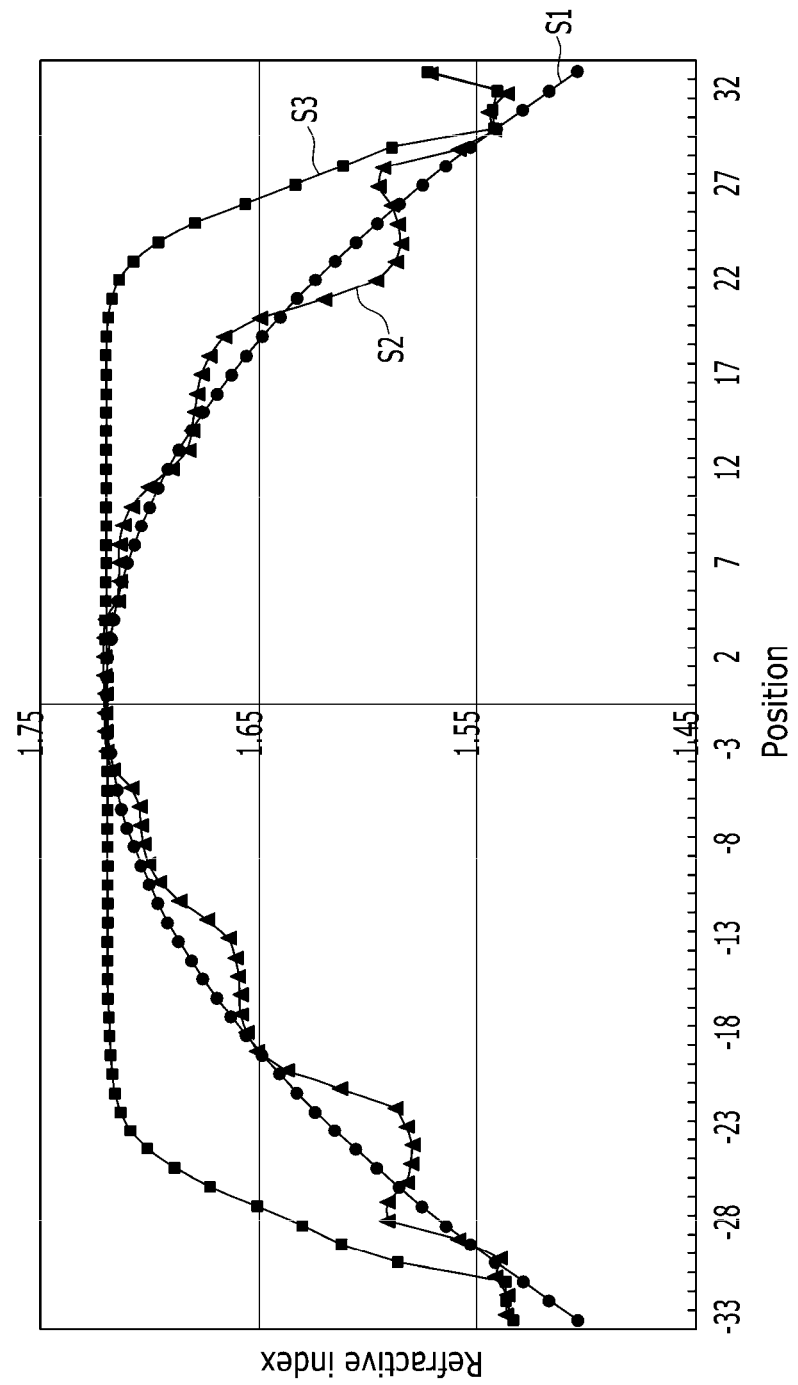
FIG. 4 is a graph of a refractive index of a lens formation layer when a lens panel according to a comparative example forms a lens.

FIG. 4 shows a graph of the refractive index of the lens formation layer when the lens panel according to a comparative example forms the lens, wherein a second line S1 is a line representing the refractive index for each position of the lens formation layer theoretically forming the ideal lens, a third line S2 is a line representing the refractive index for each position of the lens formation layer according to Comparative Example 1, and a fourth line S3 is a line representing the refractive index for each position of the lens formation layer according to Comparative Example 2.

The second line S1 has the shape of the smooth curved line as the ttheoretically ideal shape of the lens without a distorted and protruded part. In contrast, the third line S2 is a case in which a plurality of inflection points is generated to the refractive index of the liquid crystal molecules such that an aberration phenomenon is generated. Also, the fourth line S3 is a case in which the refractive index of the liquid crystal molecules is not formed with a calculated value such that the shape of a normal lens is not formed. Comparing the third line S2 and the fourth line S3 with the second line S1, the shape of the ideal lens is not formed, and this phenomenon is generated in a case of mainly designing the electrode to not smoothly form the voltage difference depending on the position. However, referring to the first line N1 of FIG. 3 according to an exemplary embodiment, by disposing the opening 20 having the smaller width than the recess portion 10 to position the boundary of the opening 20 between the center C1 and the circumference of the recess portion 10, it may be confirmed that the shape of the ideal lens may be formed like the shape of the second line S1 of FIG. 4.

Next, a display device including a lens panel according to an exemplary embodiment and a driving thereof will be described with reference to FIG. 5 and FIG. 6. The description of the same elements as in the above-described exemplary embodiment is omitted.

Figure 5:
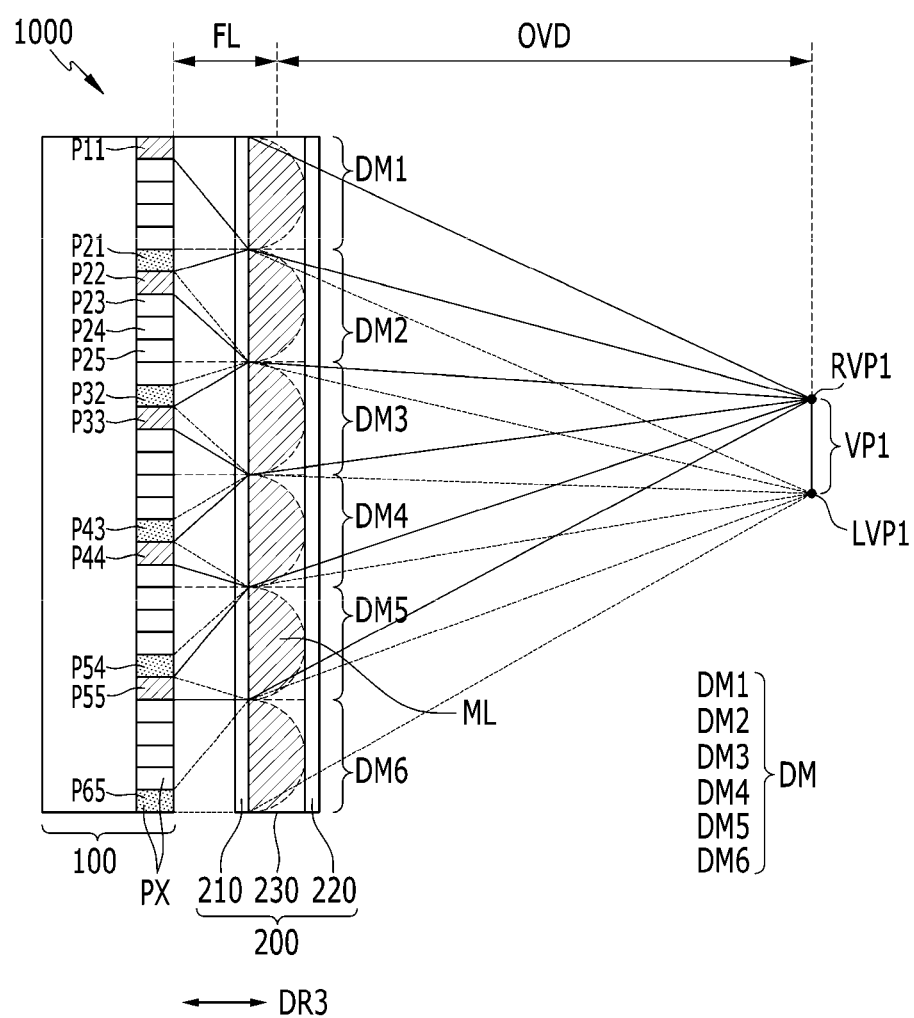
FIG. 5 is a view showing three-dimensional mode driving of a display device according to an exemplary embodiment.

FIG. 5 is a view showing three-dimensional mode driving of a display device 1000 according to an exemplary embodiment. FIG. 6 is a view showing two-dimensional mode driving of the display device 1000 according to an exemplary embodiment.

Firstly, referring to FIG. 5, the display device 1000 may include a display panel 100 and a lens panel 200. The lens panel 200 is positioned between a first viewer VP1 and the display device 1000.

The display panel 100 includes a plurality of pixels PX and displays the image according to the applied signal. The plurality of pixels PX may display one color among red (R), green (G), and blue (B), pixels PX positioned in the one column may display the same color, and pixel PX columns of different colors may be alternately disposed, however the arrangement of the pixels PX of the display panel 100 is not limited thereto. The display panel 100 may be a liquid crystal display (LCD) or an organic light emitting diode display (OLED).

In the three-dimensional mode, the lens panel 200 is operated in the above-described second mode such that the plurality of lens ML may be formed in the lens formation layer 230. The lens panel 200 may be separated from the display panel 100 so that a distance between the display surface where the image is displayed in the display panel 100 and the sectional center of the lens ML formed in the lens panel 200 becomes a focal distance FL of the lens ML. Also, the display panel 100 and the lens panel 200 may be adhered to each other by the optical adhesive material, and the thickness of at least one substrate included in the display panel 100 or the lens panel 200 is adjusted so that the distance between the display surface where the image is displayed in the display panel 100 and the sectional center of the lens ML formed in the lens panel 200 may be the focal distance FL of the lens ML.

Each domain DM of the lens panel 200 overlaps two or more pixels PX of the display panel 100 in a plan view, and the light of the image displayed by the pixels PX overlapping each domain DM may pass through the corresponding domains DM. The light incident from the pixels PX corresponding to each domain DM may be refracted at the different angles depending on the position in the domain DM, and may progress.

A distance from a sectional center of the lens ML formed in the lens panel 200 and a position at which an optimized stereoscopic image may be observed is referred to as an optimal viewing distance OVD.

It is described that a first viewer VP1 having a left eye LVP1 and a right eye RVP1 is positioned at the optimal viewing distance OVD. For example, the light respectively emitted from a (2-1) pixel P21, a (2-2) pixel P22, a (2-3) pixel P23, a (2-4) pixel P24, and a (2-5) pixel P25 that correspond to the second domain DM2 is refracted at different angles in the lens ML of the second domain DM2 and progresses in different directions. Among them, the light emitted from the (2-1) pixel P21 may be incident to a left eye LVP1 of the first viewer VP1, and the light emitted from the (2-2) pixel P22 may be incident to a right eye RVP1 of the first viewer VP1. This is because the light emitted from the (2-2) pixel P22 is refracted with the smaller angle than the light emitted from the (2-1) pixel P21 in the lens ML of the second domain DM2. That is, the angle of the light refracted in the lens is differentiated as the position of the light is differentiated, thereby the light may be incident to the different positions.

By the same method, the light emitted from a (1-1) pixel P11 may be incident to the right eye RVP1 of the first viewer VP1. The light emitted from a (3-2) pixel P32 may be incident to the left eye LVP1 of the first viewer VP1, and the light emitted from a (3-3) pixel P33 may be incident to the right eye RVP1 of the first viewer VP1. The light emitted from a (4-3) pixel P43 may be incident to the left eye LVP1 of the first viewer VP1, and the light emitted from a (4-4) pixel P44 may be incident to the right eye RVP1 of the first viewer VP1. The light emitted from a 5-4 pixel P54 may be incident to the left eye LVP1 of the first viewer VP1, and the light emitted from a (5-5) pixel P55 may be incident to the right eye RVP1 of the first viewer VP1. The light emitted from a (6-5) pixel P65 may be incident to the left eye LVP1 of the first viewer VP1.

That is, the right eye RVP1 of the first viewer VP1 recognizes the light emitted from the (1-1) pixel P11, the (2-2) pixel P22, the (3-3) pixel P33, the (4-4) pixel P44, and the (5-5) pixel P55, and the left eye LVP1 of the first viewer VP1 recognizes the light emitted from the (2-1) pixel P21, the (3-2) pixel P32, the (4-3) pixel P43, the (5-4) pixel P54, and the (6-5) pixel P65. The right eye RVP1 and the left eye LVP1 of the first viewer VP1 respectively recognize the images of the different pixels PX, thereby feeling depth perception or stereoscopic perception of the image.

According to the present exemplary embodiment, as a profile of the lens formed by the lens panel 200 in the three-dimensional mode may be improved, the characteristic of the 3D image observed through the display device 1000 may be improved.

Figure 6:
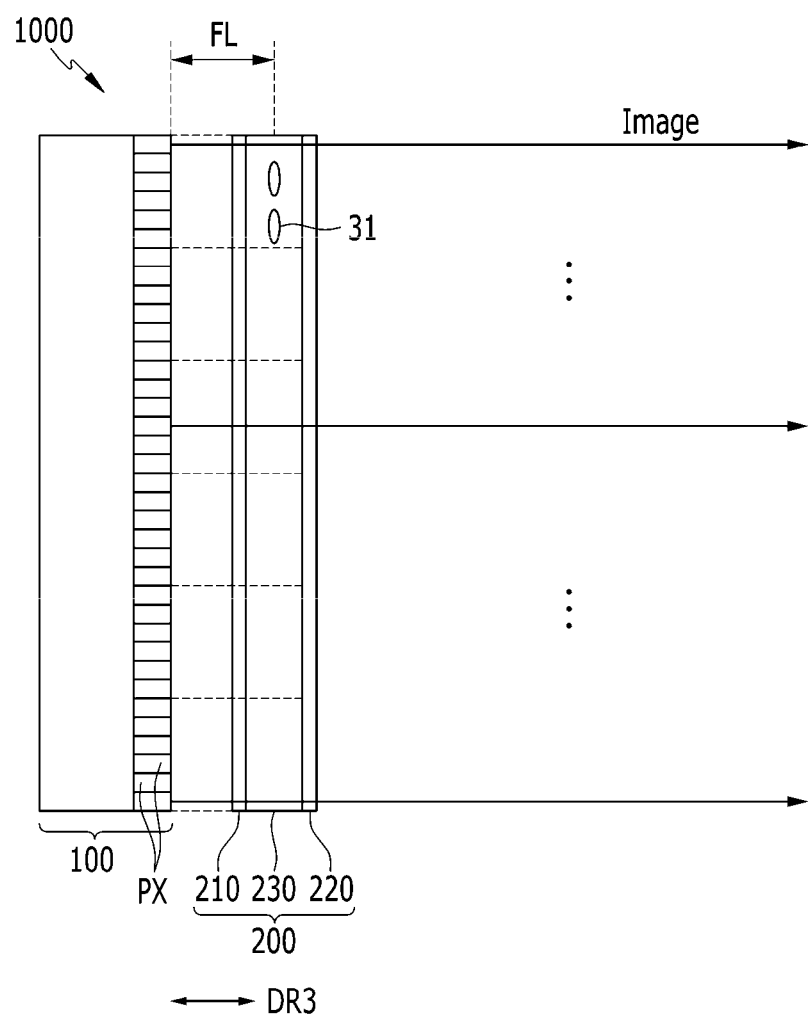
FIG. 6 is a view showing two-dimensional mode driving of a display device according to an exemplary embodiment.

FIG. 6 is a view showing two-dimensional mode driving of the display device 1000 according to an exemplary embodiment. In the two-dimensional mode, the lens panel 200 is operated in the above-described first mode such that the lens ML is not formed in the lens formation layer 230 and the liquid crystal molecules 31 may be arranged in a constant direction. That is, in the two-dimensional mode, the lens panel 200 is turned off such that the image displayed in the display panel 100 passes through the lens panel 200 as it is, thereby being recognized as the 2D image by the viewer.

The switching driving method of the two-dimensional mode and the three-dimensional mode according to an exemplary embodiment has been described, however the embodiments are not limited thereto, and the embodiments may be applied to a switching driving method of the two-dimensional mode and the three-dimensional mode that may be driven by applying the lens panel capable of realizing the first mode and the second mode.

Next, the lens panel according to an exemplary embodiment will be described with reference to FIG. 7 as well as FIG. 1. The description for the same configurations as in the above-described exemplary embodiment is omitted.

Figure 7:
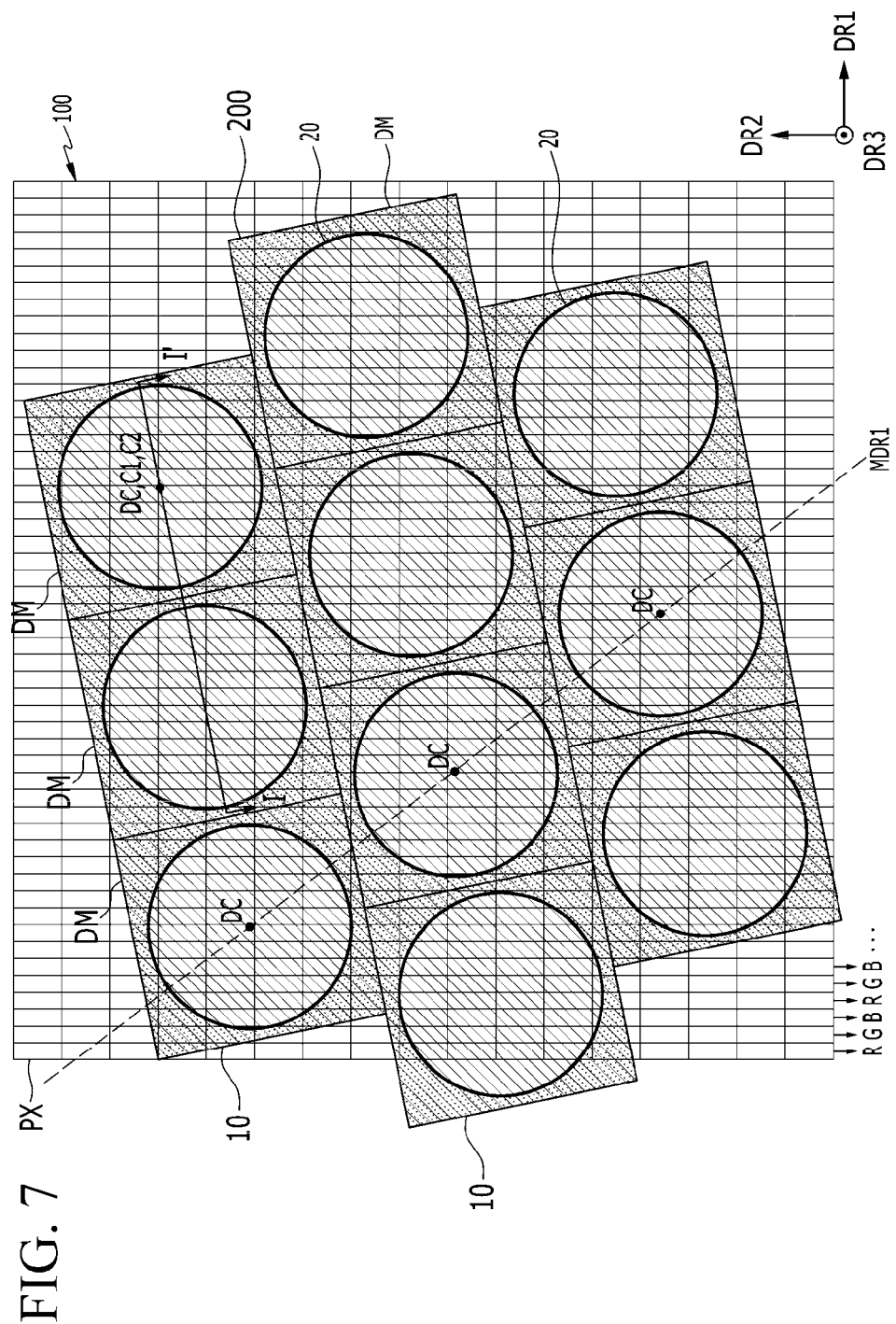
FIG. 7 is a top plan view of a lens panel according to an exemplary embodiment.

FIG. 7 is a top plan view of a lens panel 200 according to an exemplary embodiment.

The domain DM of the region where one lens ML is formed in the lens panel 200 may be defined with a quadrangle. The domain DM as the quadrangle may be adjacent to six surrounding domains DM, and two adjacent domains DM may share one side and be adjacent. The lengths of the sides of the quadrangular domains DM may be the same to form a square, however they are not limited thereto, and the lengths of the sides may be different from each other.

In the first electrode 212, the circumference of the plurality of recess portions 10 as the electrode of the concave shape may also be quadrangular. The recess portion 10 may have the approximately semi-circular shape in a sectional view, and the circumference of the recess portion 10 may have the approximately quadrangular shape in a plan view. The circumference of the quadrangular shape of one recess portion 10 may match the boundary of the quadrangular shape of the domains DM or may be positioned inside the boundary of the quadrangular shape of the domain DM.

The opening 20 of the second electrode 222 may have the circular shape in a plan view, and the circumference of the circular shape of the opening 20 may be positioned inside the circumference of the hexagonal shape of the recess portion 10.

In a plan view, the center DC of the domain DM, the center C1 of the recess portion 10, and the center C2 of the opening 20 may be approximately matched.

The lens panel 200 may be together used with the display panel 100, and when the pixels PX of the display panel 100 are arranged in the row and the column that are respectively parallel to the first direction DR1 and the second direction DR2, the domains DM of the lens panel 200 may be arranged in the direction that is obliquely inclined with respect to the first direction DR1 and the second direction DR2. That is, the first domain direction MDR1 connecting the center DC of the domains DM by the straight line may be obliquely slanted with respect to the second direction DR2.

Next, the lens panel according to an exemplary embodiment will be described with reference to FIG. 8 as well as FIG. 1, which is a cross-sectional view along the line I-I' of FIG. 8. The description for the same configurations as in the above-described exemplary embodiment is omitted.

Figure 8:
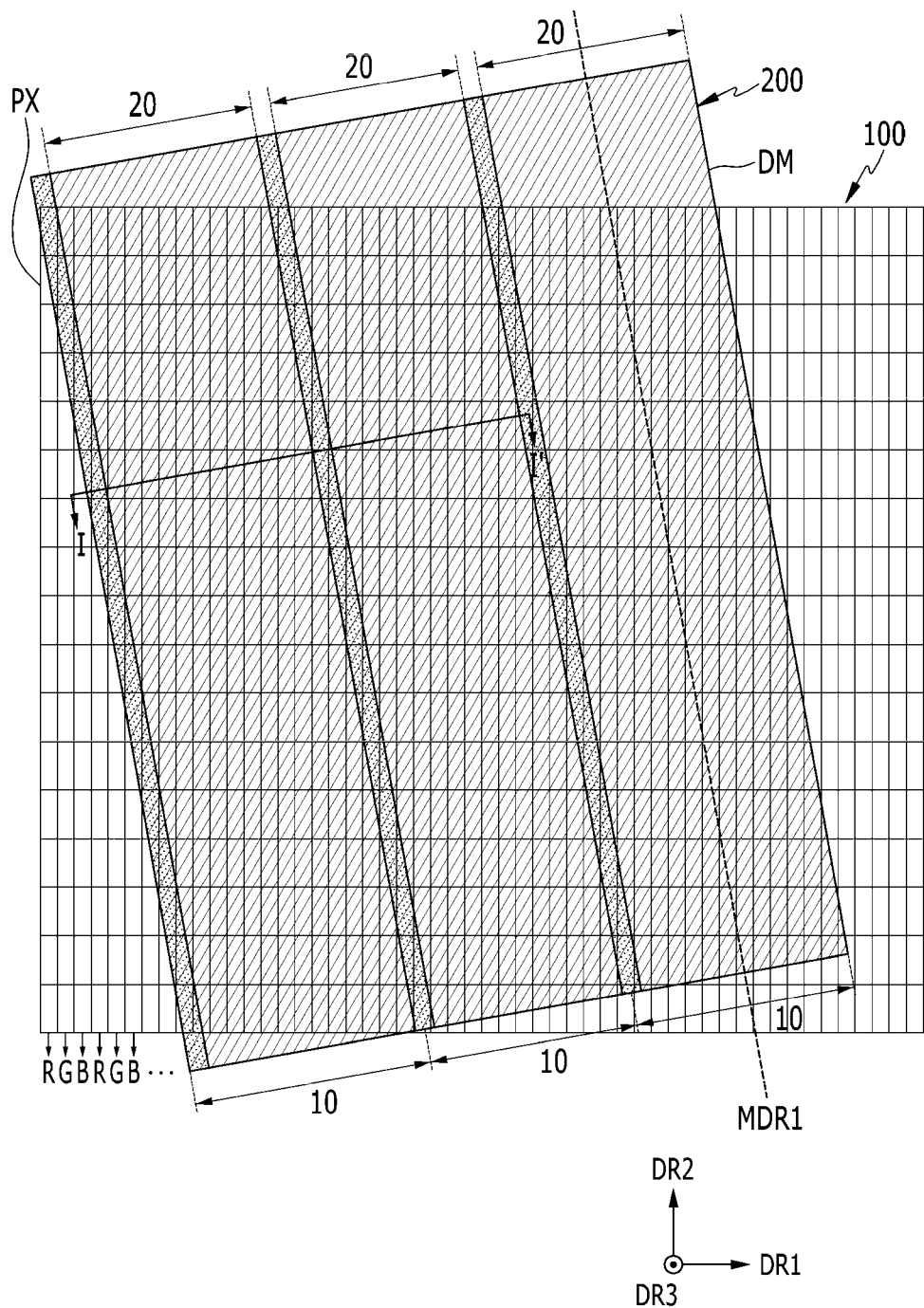
FIG. 8 is a top plan view of a lens panel according to an exemplary embodiment.

FIG. 8 is a top plan view of a lens panel 200 according to an exemplary embodiment.

The domain DM of the region where one lens ML is formed in the lens panel 200 may be defined as an elongated rectangle traversing the entire display panel 100. This domain DM may be adjacent to two adjacent domains DM and the two adjacent domains DM may share one side therewith.

In the first electrode 212, the circumference of the recess portion 10 as the electrode with the concave shape may also be the elongated rectangle traversing the entire display panel 100. The surface of the recess portion 10 may have a shape of which a long approximately circular cylinder is cut in half lengthwise. The circumference of the one recess portion 10 may be matched with the boundary of the domains DM or may be positioned inside the boundary of the domain DM.

The opening 20 of the second electrode 222 may have the elongated rectangle shape traversing the entire display panel 100 in a plan view, and the circumference of the opening 20 may be positioned inside the circumference of the recess portion 10.

The shape of the lens ML formed in the lens formation layer 230 by the first electrode 212 and the second electrode 222 may be the shape of which the long circular cylinder is cut in half lengthwise.

The lens panel 200 may be used together with the display panel 100, and when the pixels PX of the display panel 100 are arranged in the row and the column that are respectively parallel to the first direction DR1 and the second direction DR2, the domains DM of the lens panel 200 may be arranged in the direction that is obliquely inclined with respect to the first direction DR1 and the second direction DR2. That is, the first domain direction MDR1 as the center axis of one domain DM may be obliquely slanted with respect to the second direction DR2.

The lens panel according to an exemplary embodiment may be variously applied to control the path of the light in the various three-dimensional display systems as well as the above-described display device.

While the inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

<Description of symbols>

| | |
|---|---|
| 10: recess portion | 20: opening |
| 100: display panel | 200: lens panel |
| 210: first electrode unit | 212: first electrode |
| 222: second electrode | 220: second electrode unit |
| 230: lens formation layer | 1000: display device |

What is claimed is:

1. A display device comprising:
a display panel including a plurality of pixels; and
a lens panel positioned at a side of the display panel in a direction in which the display panel is configured to display an image,
wherein the lens panel includes:
a first electrode having a plurality of concave portions,
a second electrode having a plurality of openings respectively overlapping the plurality of concave portions one by one,
a lens formation layer positioned between the first electrode and the second electrode,
a concave portion among the plurality of concave portions overlapping two or more pixels among the plurality of pixels, and an opening among the openings overlapping the two or more pixels among the plurality of pixels, and
a circumference of the opening is positioned inside a circumference of the concave portion,
wherein the circumference of the concave portion is hexagonal, and the circumference of the opening is hexagonal.

2. The display device of claim 1, further comprising:
a substrate facing the second electrode with the first electrode interposed therebetween, and
wherein a center of each of the plurality of concave portions is closest to and faces the substrate.

3. The display device of claim 2, wherein:
the center of each of the plurality of concave portions matches a center of each of the plurality of openings that respectively corresponds to the concave portions one by one.

4. The display device of claim 3, wherein:
the plurality of pixels are arranged in a first direction and a second direction that are perpendicular to each other, and
a straight line connecting two or more among the centers of the plurality of concave portions are oblique with respect to the first direction and the second direction.

5. A display device comprising:
a display panel including a plurality of pixels; and
a lens panel positioned at a side of the display panel in a direction in which the display panel is configured to display an image,
wherein the lens panel includes:
a first electrode having a plurality of concave portions,
a second electrode having a plurality of openings respectively overlapping the plurality of concave portions one by one, and
a lens formation layer positioned between the first electrode and the second electrode,
a concave portion among the plurality of concave portions overlapping two or more pixels among the plurality of pixels, and an opening among the openings overlapping the two or more pixels among the plurality of pixels, and
a circumference of the opening is positioned inside a circumference of the concave portion,
wherein
the circumference of the concave portion is quadrangular, and the circumference of the opening is circular.

6. The display device of claim 4, wherein:
a difference between a width of the opening and a width of the concave portion is in a range from about 0.1 micrometers to about 5 micrometers.

7. The display device of claim 1, wherein:
the lens formation layer is configured to realize a first mode or a second mode depending on application of voltages to the first electrode and the second electrode.

8. The display device of claim 7, wherein:
the lens formation layer includes a plurality of liquid crystal molecules.

9. The display device of claim 8, wherein:
if a voltage difference is applied between the first electrode and the second electrode, the plurality of liquid crystal molecules are arranged in a shape of lenses that respectively correspond to the plurality of concave portions one by one.

10. The display device of claim 2, wherein:
a concave part of each of the plurality of concave portions is filled with at least one of a resin and an alignment material.

11. The display device of claim 2, further comprising:
a first resin layer positioned between the substrate and the first electrode and having a surface with a shape that is concave with a same shape as the plurality of concave portions at positions corresponding to the plurality of concave portions.

12. The display device of claim 2, wherein:
the display panel and the lens panel are adhered to each other by an optical adhesion material.

* * * * *